United States Patent [19]
Karapita

[11] 3,822,051
[45] July 2, 1974

[54] TELESCOPIC SUPPORT

[76] Inventor: Alexander Donald Karapita, 44 Lyme Regis Crescent, Scarborough, Ontario, Canada

[22] Filed: Aug. 13, 1971

[21] Appl. No.: 171,555

[52] U.S. Cl.................. 248/333, 403/81, 403/109
[51] Int. Cl............................................ F16m 13/00
[58] Field of Search .......... 248/157, 320, 321, 333, 248/337, 338, 404, 405; 52/111

[56] References Cited
UNITED STATES PATENTS

| | | | |
|---|---|---|---|
| 1,242,110 | 10/1917 | Koken | 248/405 |
| 1,651,940 | 12/1927 | Askenas | 52/111 |
| 2,176,536 | 10/1939 | McCauley | 248/405 X |
| 2,584,015 | 1/1952 | Hawes | 248/354 S |
| 2,835,520 | 5/1958 | Schiring et al. | 248/333 UX |
| 3,191,904 | 6/1965 | Karapita | 248/333 |
| R22,365 | 8/1943 | Gebhard et al. | 52/111 X |

FOREIGN PATENTS OR APPLICATIONS 1,054,667  1/1967  Great Britain...................... 248/333

*Primary Examiner*—William H. Schultz

[57] ABSTRACT

A manually operable, adjustable telescopic suspension support in which a second tube is slidable axially in a first tube. The second tube is non-rotatable axially with respect to the first tube and carries fixed means having a threaded aperture which is engaged by a threaded rod of coarse pitch fixed longitudinally in the first tube and selectively releasable to rotate in either direction. The support is axially extended or collapsed by exerting manual force axially on the first tube with releasing clutch means to unlock the rod and exerting force axially on the first tube.

The second tube is non-rotatable axially with respect to the first tube and carries fixed means having a longitudinal threaded bore which is engaged by a threaded rod fixed longitudinally in the first tube and rotatable selectively in each direction. The support may be extended or collapsed by turning the rod. The support may also be extended or collapsed by exerting force axially on the first tube with releasable clutch means to lock the rod against turning and thereby lock the support. Three telescopic tubes may be used where the fixed means in the second tube is rotatable about its bore and carries an external thread engagable with an internal threaded third tube slidable axially in the second tube.

7 Claims, 10 Drawing Figures

PATENTED JUL 2 1974
3,822,051
SHEET 1 OF 3
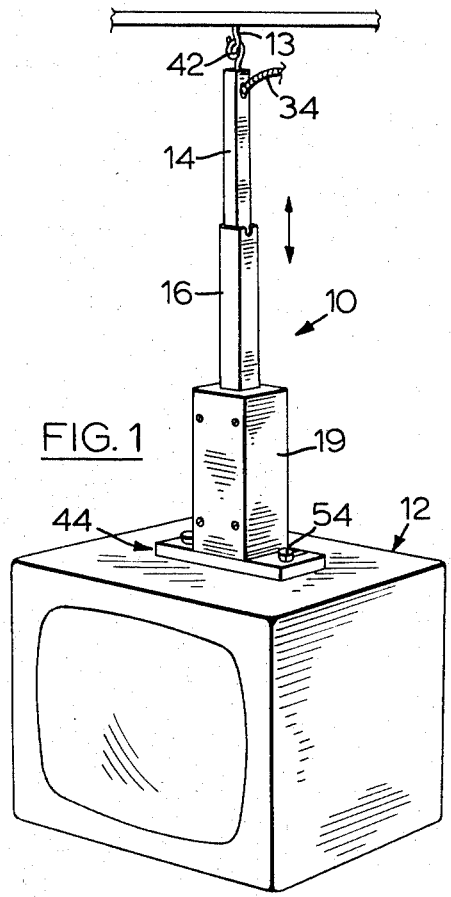
FIG. 1
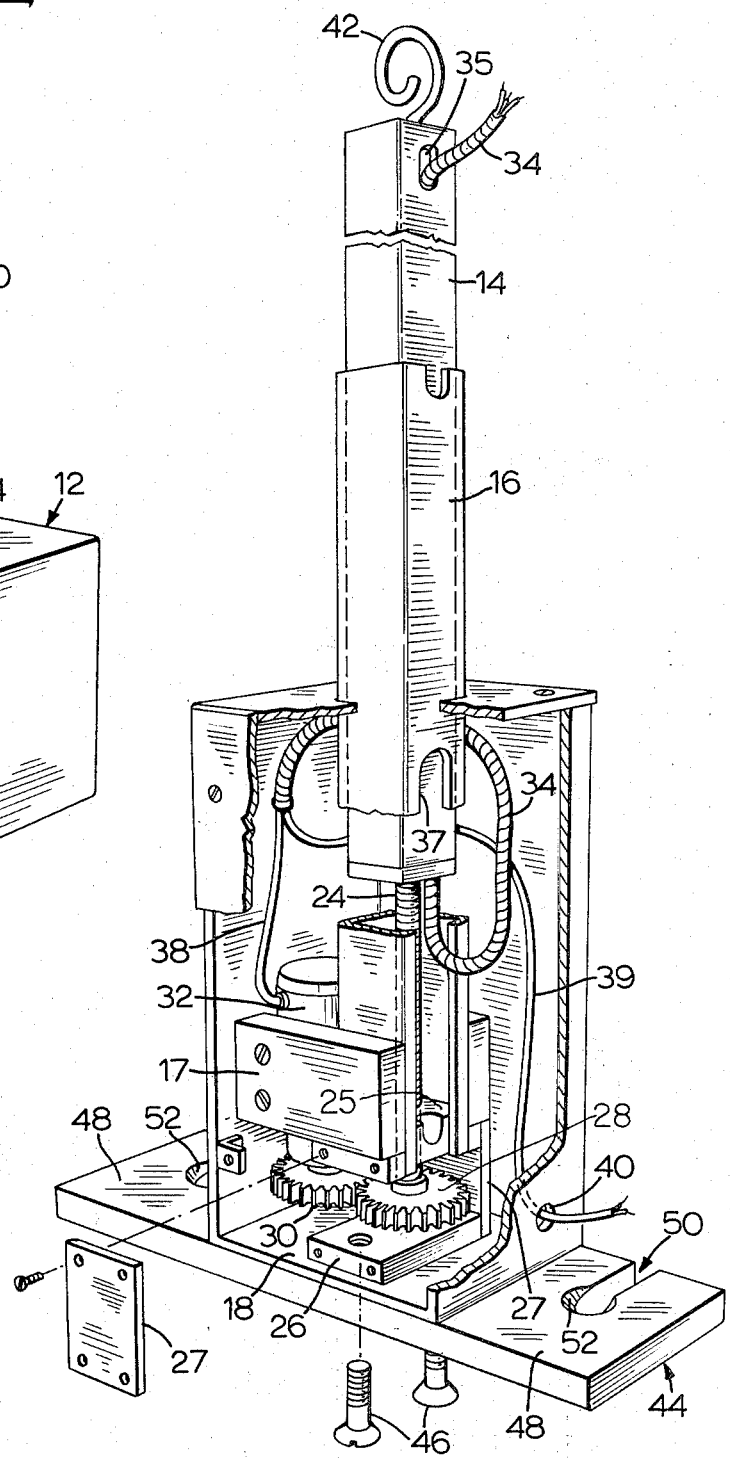
FIG. 3
FIG. 2
INVENTOR.
ALEXANDER D. KARAPITA
BY Westell & Hanley

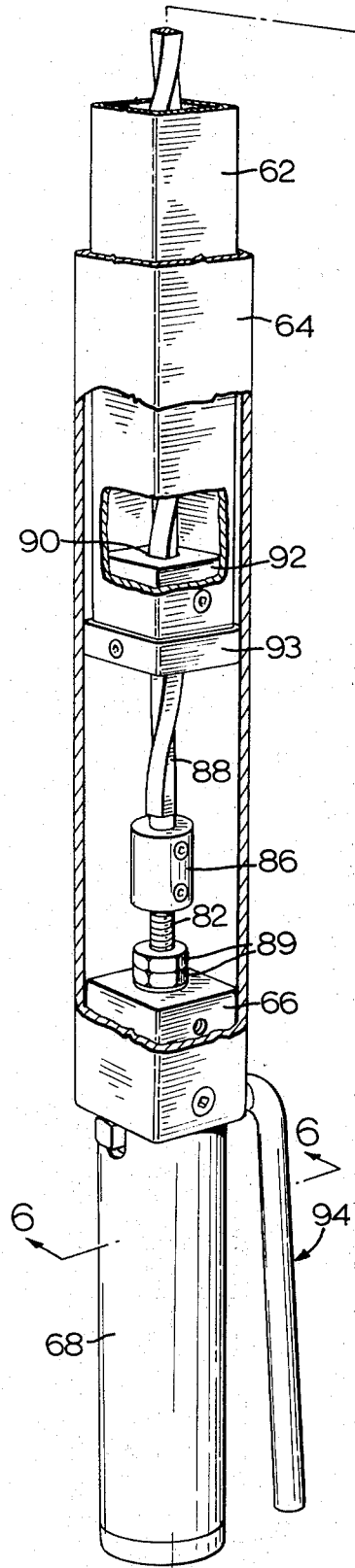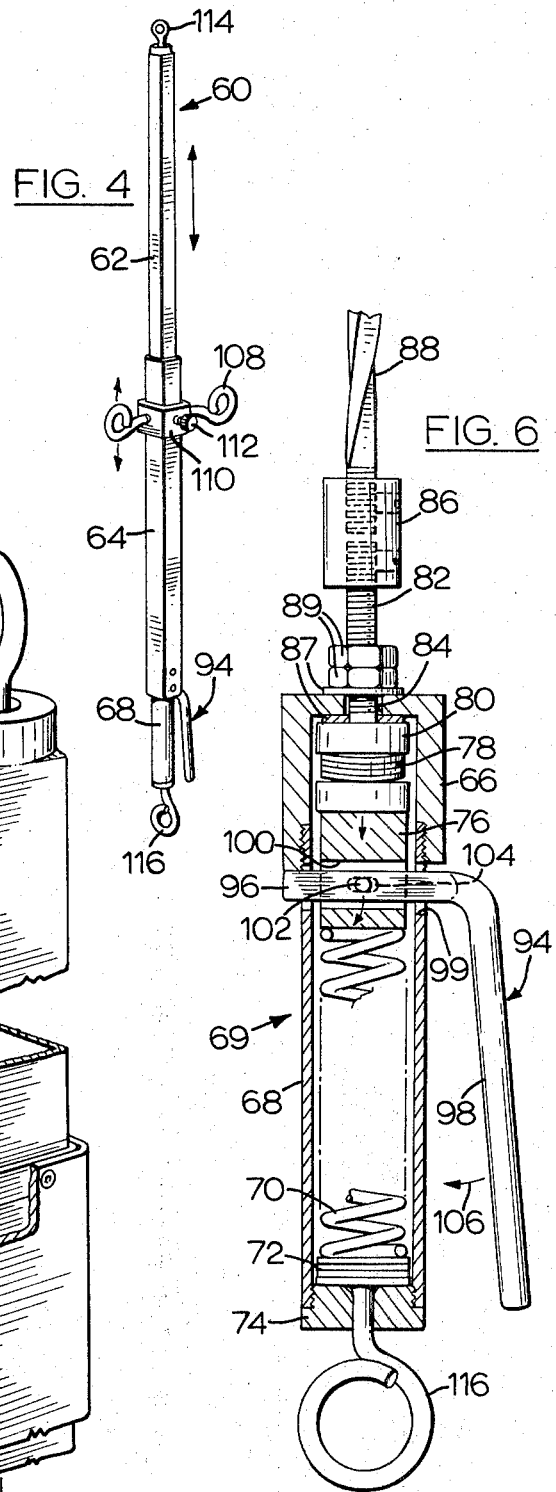

PATENTED JUL 2 1974 3,822,051

INVENTOR.
ALEXANDER D. KARAPITA

BY *Westell & Hanley*

TELESCOPIC SUPPORT

The present invention relates to an adjustable telescopic support.

Telescopic supports in use operate on the principle that threaded tubes comprising the support rotate to advance threaded sections, for example as seen in U.S. Pat. No. 2,827,350 issued Mar. 18, 1958 to R. G. Galloway. This results in rotation of the article which is being supported.

It is an object of the present invention to provide a telescopic support in which an article when supported does not rotate as the support is extended or retracted.

It is a further object of the invention to provide a telescopic support having improved means for adjustment in the length of the support.

Example embodiments of the invention are shown in the accompanying drawings in which:

FIG. 1 is a perspective view of a motorized telescopic support for a television set;

FIG. 2 is a perspective view of the support shown in FIG. 1, partly broken away;

FIG. 3 is a side view, partly in cross-section, of the central leg portion of the support within the housing;

FIG. 4 is an alternate embodiment of the invention showing, in perspective, a manually operable support;

FIG. 5 is a perspective view of the device shown in FIG. 4, partly in cross-section;

FIG. 6 is a view in cross-section taken along line 6—6 of FIG. 5;

Figure 7:
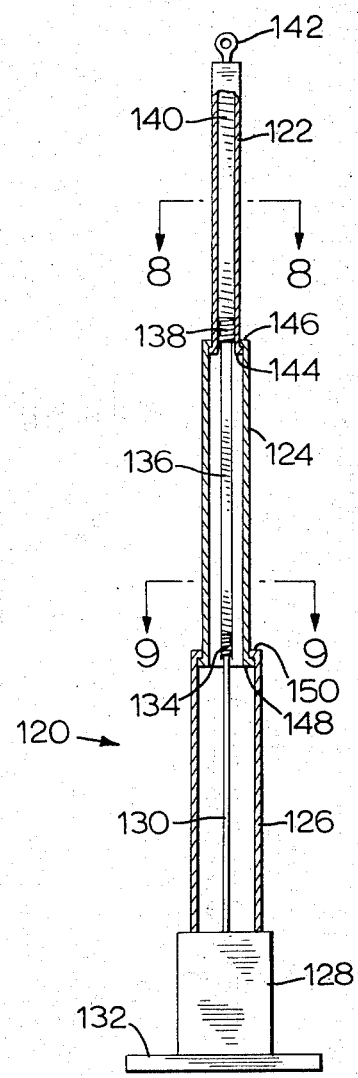
FIG. 7 is a side view, partly in cross-section, of a further embodiment of the invention showing a telescopic support having three tubes.
Figure 8:
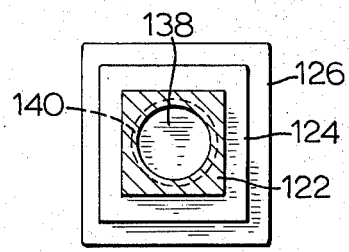
FIG. 8 is a view in cross-section taken along the line 8—8 of FIG. 7 with respect only to the tubes.
Figure 9:
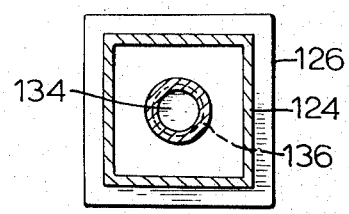
FIG. 9 is a view in cross-section taken along the line 9—9 of FIG. 7 with respect only to the tubes.

The example embodiment shown in FIGS. 1 to 3 of the drawings consists of a telescopic support 10 suspending a television set 12 from an overhead rail hook 13. Support 10 comprises a first inner square tube 14 freely slidable axially in a second outer square tube 16 which is secured at one end by a bracket 17 to inside wall 18 of a housing 19. As seen in FIG. 3, one end of tube 14, travelling in tube 16, carries a fixed plug 20 which has a threaded bore 22 adapted to receive and engage a threaded rod 24 passing through tube 16 offset from the central axis of the tubes. One end of rod 24 passes journally through a plug 25 in the lower end of tube 16 and is also journally mounted in a block 26 fastened to wall 18 of housing 19. Tube 16 is fixed in relation to block 26 by bracket 27. A gear 28 is keyed to rod 24 adjacent block 26 and meshes with a further gear 30 driven through suitable reduction gearing by an electric motor 32 which is also supported by bracket 17. The free upper end of rod 24 close to the upper end of tube 16 carries a cap 33.

An electrical multi-wired flexible cable 34 leads into tube 14 through an aperture 35 from a power and signal source not shown (the free end of the cable may carry a plug for connecting with a wall source). Cable 34 passes down through tube 14 and through a bore 36 in plug 20 being held in position by a press fit in the bore. The lower end portion of cable 34 passes out from tube 16 through a longitudinal slot 37 into housing 19 where it is bifurcated, one lead 38 being connected with motor 32 to provide power and another lead 39 passing out of housing 19 through an aperture 40 for connection with television set 12 to provide power and a signal. The free end of tube 14 carries a swivelly mounted hook 42.

A supporting plate 44 is fixed to bottom wall 18 of housing 19 by screw 46 and has wings 48 extending laterally from each side of the housing, each wing having a slot 50 with a counter sink 52 to receive a bolt 54 (see FIG. 1) connecting television set 12 (or any other device to be held) to the support.

In the operation of the device shown in FIGS. 1 to 3 of the drawings, motor 32 is actuated to run either in forward or in reverse direction by the suitable remote control means (not shown) and, rotates gears 30 and 28 which in turn rotates rod 24, causing tube 14 to move inwardly or outwardly with respect to tube 16, depending upon the direction of rotation of rod 24. This inward and outward axial movement of tube 14 is achieved because tube 16 is fixed in relation to rod 24 and, because tubes 14 and 16 are non-circular, tube 14 cannot rotate relative to tube 16. As tube 14 moves into and out of tube 16, cable 34, which is fixed in plug 20 of tube 14, is able to travel along slot 37 with the required length of the cable being accommodated within the free space in housing 19. The outer and inner limits of movement of tube 14 with respect to tube 16, i.e. between a fully extended and a fully collapsed position, are governed by end cap 33 and plug 25 respectively.

In the alternate example embodiment shown in FIGS. 4 to 6 of the drawings a telescopic support 60 consists of a first square tube 62 which is freely slidable axially in a second square tube 64. One end of tube 64 carries a fixed cup 66 which opens outwardly and a tubular handle 68 is attached to the cup in threaded engagement.

A compression spring 70 is carried within handle 68, bearing at one end against a plurality of spacers 72 which in turn bear against a plug 74 threaded into the free end of the handle, and bearing at the other end against a plunger 76 riding in cup 66. Plunger 76 bears against a plurality of nested, concave friction washers 78 which in turn bear against head 80 of a threaded bolt 82. Thus cup 66 and handle 68 comprise a housing 69 which contains clutch means consisting of spring 70, plunger 76, washers 78 and head 80 of bolt 82. Threaded bolt 82 projects through an aperture 84 in the closed end of cup 66 and carries a coupling 86 to which the threaded end of a rod 88, located in tube 64, is also fixed. Bolt 82 is held in aperture 84 by a suitable washer 87 and locking nuts 89. Rod 88, square in cross-section and extending the length of tube 64, is twisted axially to provide a thread having a coarse pitch, for example one turn per 4 inches and passes through an aperture 90 in a plug 92 fixed in the end of tube 62 lying within tube 64. Aperture 90 is axially aligned with tubes 62 and 64 and is contoured in cross-section to provide a slidable fit for rod 88. The end of tube 62 carrying plug 92 also carries a circumscribing outer band 93 while the free end of tube 64 carries a circumscribing inner band 95.

In handle 68 an angled lever 94 has one arm 96 pivotally mounted on plunger 76 with the other arm 98 lying adjacent handle 68. Arm 96 passes through a lateral bore 99 in handle 68 and through a lateral bore 100 in plunger 76 arm 96 being freely mounted on the plunger by a pin 102 fixed to the plunger and passing through a slot 104 in the arm. The free end of arm 96 bears against the edge of cup 66.

In the operation of the embodiment of the device shown in FIGS. 4 to 6, the action of compression spring 70 against plunger 76, transmitted through washers 78 and head 80 of bolt 82, causes head 80 to bear, with washer 87, against the closed end of cup 66 which locks rod 88 against turning. Since rod 88 cannot rotate axially, plug 92 cannot move longitudinally along the rod and tube 62 because of its sliding fit together with the fact that tube 64 is fixed in relation to bolt 82 and tube 62 cannot rotate in tube 64 because of their non-circular cross-section. Thus tube 62 is effectively locked against axial movement in relation to tube 64. To move tube 62 axially inwardly or outwardly with respect to tube 64, handle 68 and lever 94 are gripped manually and the lever is moved against the handle in the direction of arrow 106 as seen in FIG. 6. This causes lever 94 to pivot about the free end of arm 96 bearing against cup 66 causing plunger 76, through the action of pin 102, to move downward against the upward thrust of compression spring 70. As plunger 76 moves downward the pressure through washers 78 is released and head 80 no longer bears against the closed end of cup 66, thus freeing rod 80 for rotation, which allows the rod to be moved longitudinally in plug 92 to rotate. Manual force applied longitudinally in either direction through handle 68 will then cause relative axial movement between tubes 62 and 64, because rod 88 and plug 92 are no longer locked together, and such movement will either lengthen or shorten support unit 60 telescopically. The outer limit of movement of tube 62 with respect to tube 64 i.e. between a fully extended and a fully collapsed position, are governed by bands 93, 95 and coupling 86 respectively.

As seen in FIG. 4, support 60 can conveniently carry a pair of wing hooks 108 attached laterally to a collar 110 which is slidable on tube 64 and releasably locked in any position on tube 64 by a thumb screw 112. Support 60 may be hung by a hook 114 swivelly mounted on the free end of tube 62. An additional hook 116 swivelly mounted on plug 74 at the free end of handle 68 provides another location for hanging an article.

It will be appreciated that rod 88 could be offset laterally from the central axis of tube 64 and that wiring similar to cable 34 in the embodiment of FIGS. 1 to 3 of the drawings could be accommodated within tubes 62 and 64. Of course the clutch mechanism would also have to be offset.

The further alternate embodiment shown in FIGS. 7 to 10 of the drawings consists of a telescopic support 120 comprising a first tube 122 externally square and internally circular freely slidable axially in a second square tube 124 which in turn is freely slidable axially in a third square tube 126. One end of tube 126 carries a housing 128 enclosing the same drive unit and mountings as shown in housing 19 of the embodiment in FIGS. 1 to 3 of the drawings, with a rod 130 being driven thereby and carrying a flange 132 for attachment of an article, for example television set or a lighting unit. Rod 130 extends slightly beyond the upper end of tube 126 and carries a worm gear 134 which engages an internally threaded tube 136 located within tube 124 and extending the length thereof. The end of tube 136 extends beyond tube 124 remote from tube 126 and carries a second worm gear 138 which meshes with threads 140 on the inner surface of tube 122. Thus tube 136 is suspended by worm gears 134 and 138 and is rotatable with respect to tube 124. The upper, free end of tube 122 carries a swivelly mounted hook 142. The lower end of tube 122 carries an external collar 144 while the upper end of tube 124 carries an inwardly directed flanges 146. Similarly the lower end of tube 124 carries an external collar 148 while the upper end of tube 126 carries an inwardly directed flange 150.

Figure 10:
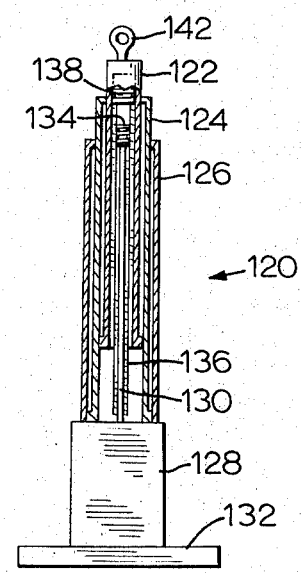
FIG. 10 is a view similar to FIG. 7 but showing the support in collapsed position.

In the operation of the device shown in FIGS. 7 to 10 of the drawings the motor (not shown) within housing 128 is actuated to rotate rod 130 axially in either direction. When support 120 is extended as shown in FIG. 7 and rod 130 is rotated in the appropriate direction, such rotation will draw tube 124 down into tube 126 by the action of worm gear 134 in tube 136. When worm gear 134 reaches the upper end of tube 136 and can advance no further, tube 136 itself begins to rotate in unison with rod 130 and worm gear 138 advances upwardly within tube 122 to draw that tube down into tube 124 until worm gear 138 reaches the upper end of tube 122 and can go no further. The end result of the operation is shown in FIG. 10 with support 120 telescoped inwardly. To extend support 120 outwardly rod 130 is driven in the opposite direction with flanges 146 and 150 engaging collars 144 and 148 respectively to limit the outward movement of tubes 122 from tube 124 and the outward movement of tube 124 from tube 126 respectively.

I claim:

1. A manually adjustable telescopic suspension support comprising:

a first tube;

a second tube projecting from one end of the first tube and slidable longitudinally therein, the second tube being non-rotatable axially with respect to the first tube;

means fixed in the second tube and having an aperture therein;

an axially rotatable rod twisted axially to provide a thread of coarse pitch, the rod being positioned longitudinally in the first tube and engaging the aperture of the fixed means in the second tube, the aperture of the fixed means being contoured in cross-section complementary to said rod to provide a slidable fit for the rod; and a handle and manually operable clutch means mounted on the first tube adjacent the other end thereof and connected with the rod releasably to allow rotation thereof.

2. A telescopic support as claimed in claim 1 including a handle fixed on said other end of the first tube and carrying a manually operable lever adapted to release the clutch means.

3. A telescopic support as claimed in claim 1 in which the clutch means comprises a housing fixed to the first tube adjacent said other end thereof, the rod passing freely through an aperture in the housing and terminating in a head located therein, friction means in the housing normally urged against the head, and means to release the friction means from the head.

4. A telescopic support as claimed in claim 3 in which the means to release the friction means comprises a plunger adapted to engage the head frictionally, a compression spring normally urging the plunger against the head, and means operable to move the plunger against the action of the compression spring.

5. A telescopic support as claimed in claim 4 in which the means operable to move the plunger comprises a lever pivotably mounted intermediate its ends on the plunger and bearing at one end laterally against the housing.

6. A telescopic support as claimed in claim 1 including a hook swivelly mounted on the free end of the second tube.

7. A telescopic support as claimed in claim 1 including a collar slidable longitudinally on the first tube and releasably securable thereto, and suspension hooks projecting laterally from the collar.

* * * * *